H. KLECKLER.
CONTROL COLUMN.
APPLICATION FILED MAY 13, 1918.
1,373,433.
Patented Apr. 5, 1921.
3 SHEETS—SHEET 1.
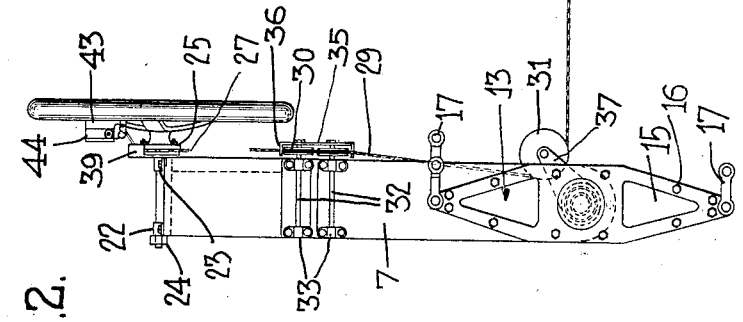
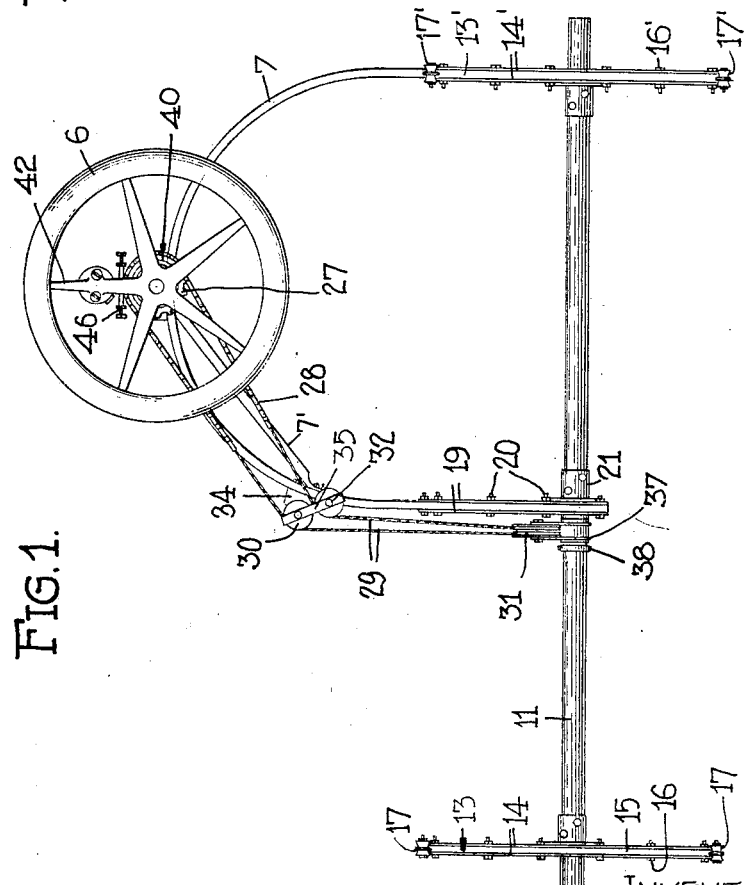
INVENTOR.
HENRY KLECKLER.
by ATTORNEY.

H. KLECKLER.
CONTROL COLUMN.
APPLICATION FILED MAY 13, 1918.
1,373,433.
Patented Apr. 5, 1921.
3 SHEETS—SHEET 2.
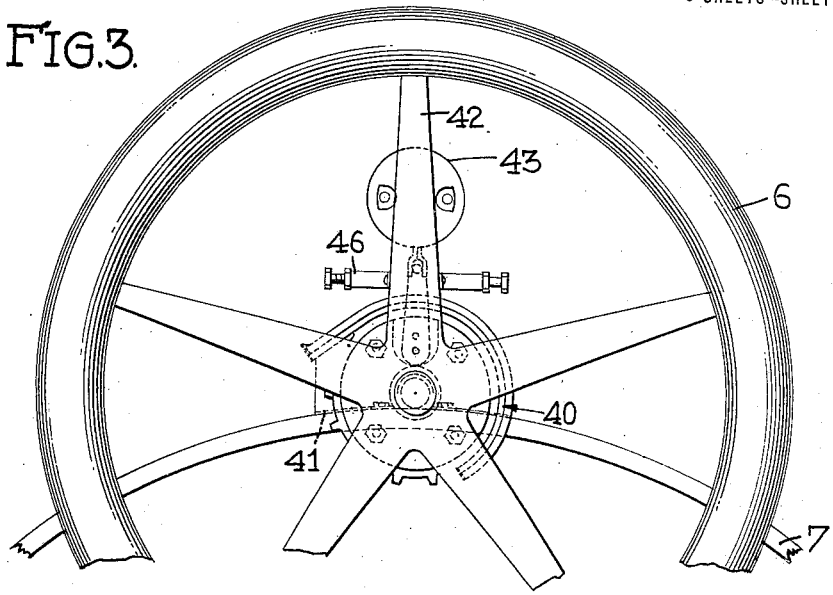
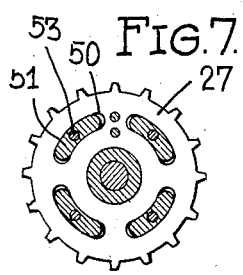
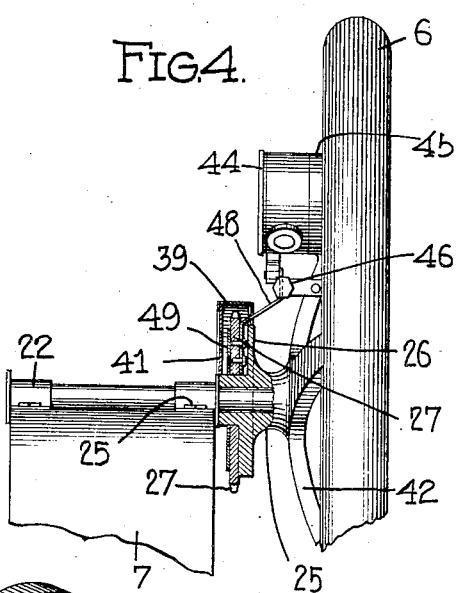
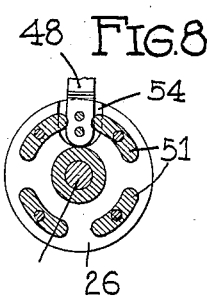
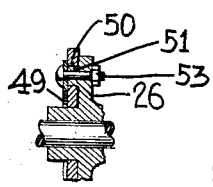
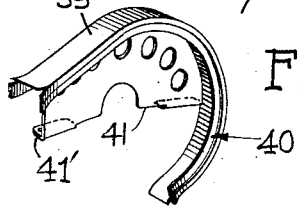
INVENTOR.
HENRY KLECKLER.
ATTORNEY

H. KLECKLER.
CONTROL COLUMN.
APPLICATION FILED MAY 13, 1918.

1,373,433.

Patented Apr. 5, 1921
3 SHEETS—SHEET 3.

INVENTOR
HENRY KLECKLER.

ATTORNEY

UNITED STATES PATENT OFFICE.

HENRY KLECKLER, OF HEMPSTEAD, NEW YORK, ASSIGNOR TO CURTISS AEROPLANE AND MOTOR CORPORATION, A CORPORATION OF NEW YORK.

CONTROL-COLUMN.

1,373,433.    Specification of Letters Patent.    Patented Apr. 5, 1921.

Application filed May 13, 1918. Serial No. 234,192.

*To all whom it may concern:*

Be it known that I, HENRY KLECKLER, a citizen of the United States, residing at Hempstead, in the county of Nassau and State of New York, have invented certain new and useful Improvements in Control-Columns, of which the following is a specification.

This invention relates to aircraft and particularly to improvements in control devices therefor.

The object of the invention is a control system embodying improved controlling and actuating devices therefor, whereby the construction is simplified and the operation of the system as a whole is improved, and whereby the control devices are rendered more dependable and more reliable than the devices of the prior art, the expense in manufacture, due to simplification and standardization, being reduced to a minimum.

More particularly, the invention relates to an improved bridge control construction and arrangement and the accessories therefor, and also includes a means for mounting thereupon servo motor control devices, whereby either the handwheel may be used alone to effect the control of the control surfaces, or the hand wheel and the servo motor control devices may be used simultaneously for effecting the control. Specifically, the bridge control comprises a rock shaft transversely mounted with reference to the aeroplane body and passing through the pilot's cockpit, and a control bridge mounted only on one end of this rockshaft, the bridge being U-shaped and one leg of the bridge serving as one of the walking beams mounted on the ends of the shaft.

Figure 5:
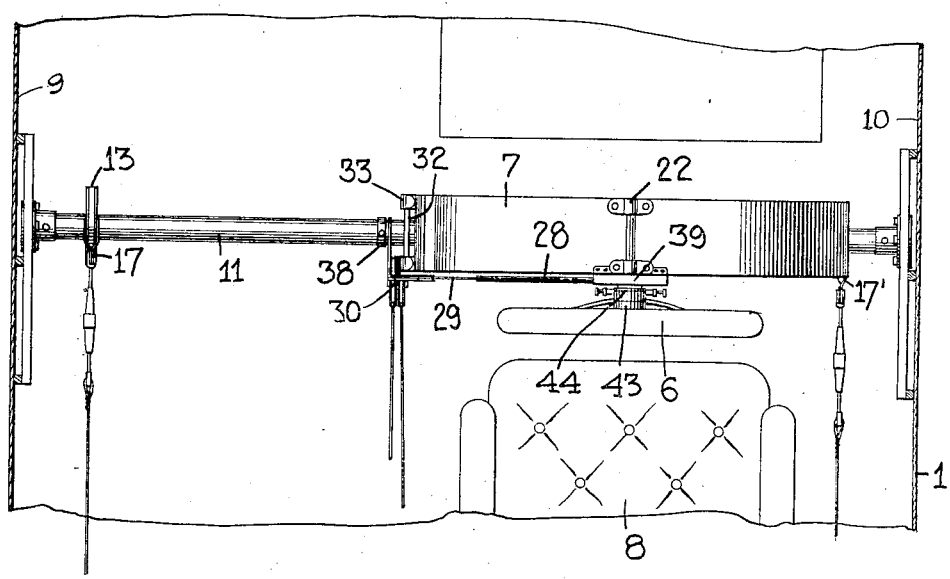
Figure 6:
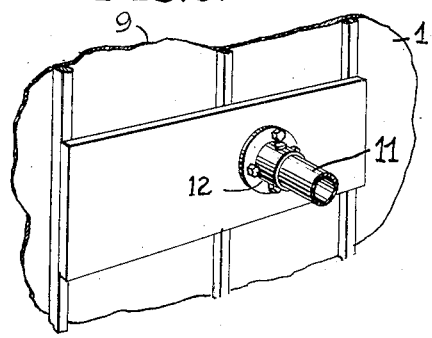

For a better understanding of this invention reference may be had to the accompanying drawings illustrating one embodiment of my invention, wherein, Figure 1 is a front view of the bridge control, Fig. 2 is a side view thereof, Fig. 3 is an enlarged front view of the hand wheel and correlated devices, Fig. 4 is a side view thereof, Fig. 5 is a plan view of the bridge control mounted within the boat hull, Fig. 6 is a detail view of the shaft mounting in the boat hull, Fig. 7 is a detail of the control bridge in section, Fig. 8 is a view corresponding thereto but looking in the opposite direction, Fig. 9 is another detail in section, and Fig. 10 is a detail of the sprocket guard.

Referring to the drawings, wherein like numerals refer to similar parts throughout, I have illustrated my invention as embodied within the hull 1 of a flying boat aircraft, the wings, elevators and ailerons not being shown for convenience in illustration. The control is of a well known type, embodying a hand wheel 6 for effecting control of the ailerons and the bridge 7 for effecting control of the elevator, the handwheel and control bridge being mounted within the pilot's cockpit, the pilot's seat being denoted by the numeral 8. Referring particularly to Fig. 6, sections of the sides of the boat hull are designated 9 and 10 respectively, and extending transversely of the boat and all the way across from side to side is a walking beam rock shaft 11 which is suitably journaled at its ends in the bearings 12, carried on the interior of the hull walls, this shaft being capable of rocking movement in the well known manner for securing the control of the elevators. Mounted on the left hand end of this shaft is a walking beam 13 which comprises a pair of sheet metal plates 14 which may be stamped out of sheet metal to conform to the shape desired. This walking beam is preferably provided with a stiffening filler 15, as of wood, which is clamped between the complementary plates 14 by any suitable means, as for instance by the plurality of bolts 16. The opposed members 14 and the intervening stiffening member 15 are provided with an opening through which the shaft 11 passes and are fixedly anchored thereto in any suitable manner as by means of welding the sheet metal members 14 or one of them to the metallic shaft 11. This walking beam has a pair of link connections 17 for connection with the elevator control cables 18.

The bridge 7 comprises an upright U-shaped (inverted) member of any suitable material as for instance wood. The left hand leg is secured to the shaft 11 by means of sheet metal clamping plates 19, these plates being secured or fixed thereto by means of bolts 20, and the whole being anchored to the shaft in a suitable manner, as by welding. Plates 19 are provided with a transverse opening through which passes the shaft and are provided with a sleeve 21 which surrounds shaft 11, this sleeve being securely welded or otherwise fastened both to the shaft and to one or both of the clamping members 19. The right hand leg of the bridge 7 is continued downwardly below the right hand end of the shaft 11 to form the right hand walking beam 13', this walking beam being thereby made integral with and a part of the bridge 7 and being fastened to the shaft 11 in a manner similar to the manner of securing the walking beam 13 thereto. In order to strengthen the left hand leg of bridge 7, I provide a diagonal brace 7' which extends from underneath the top of the bridge 7 downwardly to the point where the guide pulleys 30 are attached thereto, this brace being parallel with the chain 28.

The wheel 6 is mounted on top of the bridge 7 and is journaled thereon by means of the bearings 22, these bearings being secured to the top of the bridge by means of bolts 23. The wheel shaft is held in position by a nut 24, screw threaded on the free end thereof. This wheel is provided with a hub 25 which merges into a flange 26 and to this flange is secured a sprocket wheel 27 over which passes a sprocket chain 28 of any suitable character. This sprocket chain has its free ends connected to the aileron cables 29, these cables, as is well known, leading over a system of pulleys to the ailerons or other control surfaces for controlling the flight of the machine. For guiding and leading these cables 29 away from the control wheel to the control surfaces there is provided a pair of pulleys 30 mounted on the left hand leg of the bridge 7 and another pair of pulleys 31 mounted on a bracket carried by the shaft 11, the pulleys 30 being mounted upon a pair of shafts 32 which in turn are journaled on the bridge 7 by means of bearings 33, these bearings being conveniently secured to the bridge in a manner similar to the securing of bearings 22. In order that the upper pulley 30 may be offset horizontally from the lower pulley, the upper pulley is mounted on a base 34, this base carrying the bearings therefor and being secured directly to the control bridge 7. For insuring the maintenance of the cables 29 on the pulleys 30, there is provided a shield or guard 35 carried by the shafts 32, which has an inturned tongue 36 passing over and close to the periphery of the upper pulley 30. The pair of pulleys 31 are mounted and journaled upon a bracket 37, this bracket conveniently comprising a sleeve surrounding the shaft 11 and being retained in position against the sleeve 21 by means of the retaining collar 38. A guard 39 partially surrounds the sprocket 27 for the purpose of protecting the sprocket chain 28 and maintaining the same in meshing engagement with the sprocket, this guard being suitably fixed to the standard.

The operation of the controls is understandable from the above description of the control devices, it being noted that for controlling the ascent and descent of the machine, the pilot rocks the shaft 11 and walking beams through the control bridge 7, this effecting the adjustment and the position of the elevators. On the other hand, for maintaining the lateral balance of the machine, the pilot actuates the wheel 6 and thereby effects control of the ailerons through the actuation of the cables 29, sprocket 27 and sprocket chain 28, or if necessary the pilot may actuate both of these controls and the servo motor control simultaneously.

I have also illustrated the bridge control as adapted to servo motor control, and for this purpose one of the spokes 42 of the wheel 6 is provided with a base 43 thereon, on which may be mounted a contact closing mechanism 44 of standard construction and adapted to control the circuits of the servo motors. This same spoke 42 is machined or otherwise provided with a pair of seats for the reception of oppositely extending housings 46, the latter inclosing centering springs (not illustrated) and adjusting screws cooperating with an operating arm 48 which actuates the circuit closures, the arm or tongue 48 being carried by the sprocket 27. The wheel 6 is provided with a lost motion connection with the sprocket 27, whereby with a slight rotation of the wheel in either direction, the operating arm 48 which has its free end in the path of the circuit closures, operates the same to connect the servo motor or motors into service for the proper actuation of the cables 29. For this purpose the sprocket is provided with a plurality of elongated plates 50 concentrically arranged with reference to the shaft of the wheel, and the flange 26 has correspondingly shaped lugs 51 projecting through these slots to which is attached a plate 49, the specific attaching means comprising a plurality of bolts 53. The lugs are slightly shorter than the slots in the sprocket whereby is obtained the necessary lost motion between the sprocket and tongue 48 on one hand and the wheel on the other. The flange 26 is milled out at 54 to provide space for the necessary play of the tongue 48 and its attaching screws. The guard 39 may be formed of sheet metal and shaped in the manner indicated in Fig. 10, this guard comprising a flanged portion 40 surrounding and conforming to the periphery of the sprocket, and a web portion 41 having feet 41' for attachment to the upper part of the bridge. It is understood that suitable leads or connections (not illustrated) lead from the central mechanism 44 to the servo motors (not illustrated).

The operation of these devices is clear from the above description, it being understood that a slight rotation of the wheel 6 in either direction causes the tongue 48 to operate the circuit controllers. Upon such operation the servo motors are brought into operation to actuate the cables 29 and thereby the control surfaces and the sprocket 27. Upon actuation of the latter the tongue 48 follows the initial movement of the wheel and occupies again the neutral position illustrated in the drawings. This follow-up movement takes place step by step, the movement of the servo-motors corresponding to the movement of the wheel.

In accordance with the patent statutes I have set forth one complete embodiment of my invention, but it is understood that the invention is capable of assuming numerous forms and portions, and the claims hereto are not to be limited to the devices set forth, except as is recited specifically therein, but are to be given a construction commensurate with the scope of the invention.

What is claimed is:

1. A bridge control for aircraft, comprising an elongated shaft, a walking beam fixed to one end thereof and consisting of a pair of sheet metal clamping plates with an intermediate filler of strengthening material, a control bridge mounted upon the other end of the shaft, said control bridge consisting of a pair of sheet metal clamping plates fixed to said shaft and an intervening filler of strengthening material, and cable connections between said walking beam and said bridge and the control surfaces for the purposes set forth.

2. A bridge control for aircraft, comprising an elongated rock shaft, a walking beam attached to one end of said shaft, an inverted U-shaped control bridge having one leg attached to said shaft at a point intermediate its ends, and having its other leg attached to the other end of said shaft, said latter leg consisting of a pair of sheet metal clamping plates secured to said shaft, and an intervening filler of stiffening wood.

3. A control bridge for aircraft, comprising a rock shaft a U-shaped control bridge fixed thereto, a control wheel mounted on top of the control bridge, control cables leading from the control surfaces of the aircraft to said wheel and about one leg of the bridge only, guide pulleys for said cables mounted on one leg of said U-shaped bridge intermediate its ends, said control bridge having a diagonal brace extending downwardly from the top of said control bridge to the point of attachment of the guide pulleys thereto.

4. A control bridge for aircraft, comprising a rock shaft, a U- shaped control bridge, control cables leading from the control surfaces of the air craft and about one leg of the bridge to said wheel, guide pulleys for said cables mounted on one leg of said U-shaped bridge intermediate its ends, said control bridge having a diagonal brace extending downwardly from the top of said control bridge to the point of attachment of the guide pulleys thereto, and guide pulleys carried directly by the rock shaft for cooperation with the aforesaid guide pulleys.

5. In an aircraft, a control wheel, a sprocket drive member connected with the control cables and journaled on the wheel shaft, said sprocket having elongated and concentrically arranged slots therein, and said wheel having similarly shaped lugs but of shorter length projecting therethrough, a plate fixed to said lugs on the opposite side of said sprocket, and a circuit controller which is operable through relative displacement of said lugs and said sprocket for the purpose set forth.

6. A bridge control for aircraft, comprising a U-shaped control bridge, a rock shaft to which the legs of said U-shaped bridge are attached, a control wheel having a shaft mounted upon the top of said control bridge, said bridge having a pair of oppositely disposed bearings within which said shaft is journaled, means for retaining the shaft and wheel in operable position, cable connections from said wheel to the control surfaces of the aircraft, and a guard for said cable connections attached to said bridge.

In testimony whereof I hereunto affix my signature.

HENRY KLECKLER.